J. B. HAYDEN.
Hub.
No. 10,506.
Patented Feb. 7, 1854.
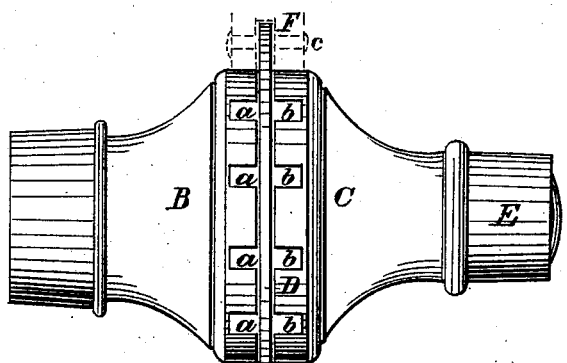
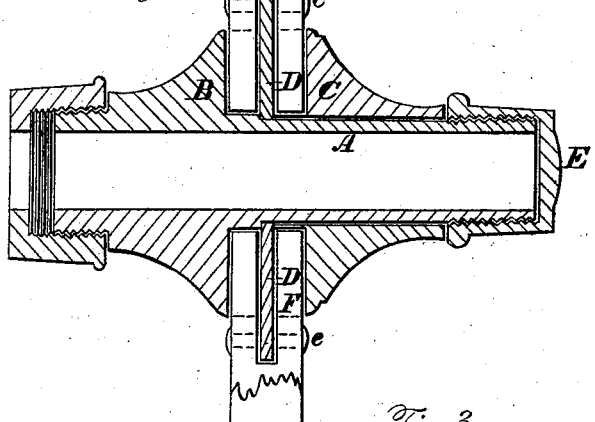
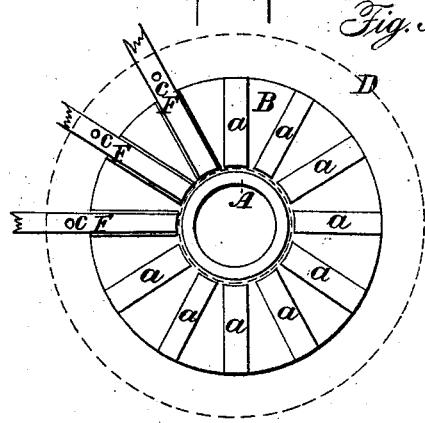

UNITED STATES PATENT OFFICE.

J. B. HAYDEN, OF EASTON, NEW YORK.

METALLIC HUB.

Specification of Letters Patent No. 10,506, dated February 7, 1854.

*To all whom it may concern:*

Be it known that I, J. B. HAYDEN, of Easton, in the county of Washington and State of New York, have invented a new and Improved Metallic Hub for Wheels; and I do hereby declare that the following is a full, clear, and exact description of the same; reference being had to the accompanying drawings, making a part of this specification, in which—

Figure 1, is an external view of the hub. Fig. 2, is a longitudinal section of the same; the lane of section being through the center of the hub. Fig. 3, is a face view of one of the radial grooved flanches.

Similar letters of reference indicate corresponding parts in the several figures.

This invention relates to an improved metallic-hub for the wheels of vehicles, said hub being so constructed as to effectually prevent the spokes from working in the mortises or recesses in the hub—an object not hitherto attained in metallic hubs.

The invention consists in having two radial grooved flanches between the faces of which is placed a circular disk. One of the flanches is attached permanently to, and may be cast with, the box, while the other fits loosely on the box, and is pressed against the disk between the two flanches, by means of a nut, on the outer end of the box. The radial grooves in the two flanches, when the flanches are properly adjusted, are placed opposite to each other, and form mortises or recesses, to receive the ends of the spokes; the mortises being divided longitudinally by the disk, which fits in saw cuts, in the ends of the spokes; rivets passing through the spokes and disk. The combination of the flanches and disk constitute the invention.

A, is the box, or circular aperture through the center of the hub, through which box, the arm of the axle passes in the usual manner.

B, is a circular flanch, which may be cast with the box, A. This flanch, B, has upon its face side, a series of radial grooves, (a), seen in Figs. 1, and 3.

C, (seen in Figs. 1 and 2,) is a circular flanch, placed loosely on the box, A, as seen in Fig. 2. The flanch, C, is provided with radial grooves, (b), see Fig. 1, precisely like the flanch, B.

D, is a circular plate or disk, placed on the box, A, and between the faces of the two disks, as shown in Figs. 1 and 2; the plate or disk, D, being somewhat larger in diameter than the flanches, B, C.

E, is a nut, on the outer end of the box, A.

The radial grooves, (a), (b), of the two flanches, are brought opposite to each other; and a saw cut, being made in the lower ends of the spokes, the spokes (represented by F,) are fitted in the mortises formed by the grooves; the plate or disk, D, fitting in the saw cut. The nut, E, is then screwed firmly up against the loose flanch, C; and the spokes are consequently firmly bound in the mortises. Rivets, (c), pass through the lower parts of the spokes, and the plate or disk, D, as shown in all the figures.

The plate or disk, D, is shown by dotted lines in Fig. 3.

By constructing the hub as above described, the spokes are effectively prevented from working in the hub. Each spoke being secured by a rivet, (c), to the plate or disk, D; and the plate or disk, D, being firmly secured between the two flanches with the ends of the spokes fitting tightly in the grooves, (a), (b), it will be readily seen that the spokes cannot possibly work loose in the mortises.

I do not claim the flanches B, and C, either with or without radial slots or recesses for the purpose of admitting the spokes; but What I do claim as my invention and desire to secure by Letters Patent is—

The disk D in combination with the recesses or "saw cuts" formed in the end of the spoke into which said disk is fitted and acts to secure said spokes in a permanent position and effectually prevent them from working in the hub as described.

J. B. HAYDEN.

Witnesses:
S. H. WALES,
L. F. COHEN.